United States Patent [19]
Moon

[11] Patent Number: 5,845,210
[45] Date of Patent: Dec. 1, 1998

[54] METHOD AND APPARATUS FOR SUPPORTING DATA TRANSMISSION OVER ANALOG AND DIGITAL CELLULAR TELEPHONE AIR INTERFACES

[75] Inventor: Billy G. Moon, Apex, N.C.

[73] Assignee: Ericsson, Inc., Research Triangle Park, N.C.

[21] Appl. No.: 698,131

[22] Filed: Aug. 15, 1996

[51] Int. Cl.⁶ ..................... H04Q 7/32
[52] U.S. Cl. .......... 455/426; 455/553; 455/557; 375/216; 375/222
[58] Field of Search .................. 455/412, 414, 455/426, 434, 466, 511, 518, 515, 556, 557, 553, 560, 561; 375/216, 222, 377; 379/93.28, 93.31

[56] References Cited

U.S. PATENT DOCUMENTS

| | | | |
|---|---|---|---|
| 5,235,598 | 8/1993 | Sasuta | 455/511 |
| 5,479,480 | 12/1995 | Scott | 455/553 |
| 5,546,444 | 8/1996 | Roach, Jr. et al. | 455/466 |
| 5,612,991 | 3/1997 | Nair et al. | 455/557 |

FOREIGN PATENT DOCUMENTS

| | | |
|---|---|---|
| 0 615 393 | 9/1994 | European Pat. Off. . |
| 0 661 893 | 7/1995 | European Pat. Off. . |
| 95/14359 | 5/1995 | WIPO . |
| 95/24791 | 9/1995 | WIPO . |
| 95/26603 | 10/1995 | WIPO . |

*Primary Examiner*—Reinhard J. Eisenzopf
*Assistant Examiner*—Lester G. Kincaid
*Attorney, Agent, or Firm*—Jenkens & Gilchrist, P.C.

[57] ABSTRACT

Mobile stations include a data pump functionality for performing digital bit to waveform coding on a received digital data signal. The waveform coded output (analog data signal) is transmitted over the analog air interface using either an analog traffic channel or analog control channel. For transmission over the analog control channel, the data pump functionality multiplexes the wave form coded analog data signal with mobile station generated cellular system control signals. A data pump functionality is also provided at the other end of the air interface transmission to recover the digital data signal from the waveform coded analog data signal transmission. De-multiplexing of the received analog control channel transmission to extract the data signal is also performed, if necessary. For a data communication sent instead to the mobile station, the reverse operations are performed by the included data pump functionalities at either end of the analog air interface. Thus, the mobile station supports the carrying of IS-130/135 modem functionality on either an analog traffic channel or an analog control channel.

28 Claims, 2 Drawing Sheets

METHOD AND APPARATUS FOR SUPPORTING DATA TRANSMISSION OVER ANALOG AND DIGITAL CELLULAR TELEPHONE AIR INTERFACES

BACKGROUND OF THE INVENTION

1. Technical Field of the Invention

The present invention relates to cellular telephone networks and, in particular, to a method and apparatus for supporting the transmission of data over both an analog and a digital cellular telephone air interface.

2. Description of Related Art

Cellular telephone networks support a plurality of calling services. The most commonly recognized and widely used calling service relates to the handling of voice communications to and from the mobile stations of cellular subscribers. Cellular telephone networks further support the provision of data calling services. For example, asynchronous data communications and facsimile communications are also supported by the cellular telephone network.

Cellular telephone networks utilize a number of different types of air interfaces for handling radio frequency communications between a mobile station and a base station. Historically, cellular communications, both voice and data, have been effectuated over an analog air interface using an analog traffic channel. For data communications, this typically necessitates the use of a modem at each end of the air interface to modulate the digital data signal for analog transmission. Recently, however, new capabilities have been provided in implementing a digital air interface for cellular service (see, for example, the TIA/EIA IS-130/135 Specification). The availability of a digital air interface advantageously obviates the need for use of a modem at the mobile station when engaging in a digital data communication. Thus, data terminal equipment, such as a laptop computer, may be connected easily to the mobile station, with the digital data signal carried over a digital traffic channel of the digital air interface.

There may exist instances within the cellular telephone network where a digital traffic channel on the digital air interface may not be available for use. For example, all digital traffic channels may at the time of mobile station access be in use handling the communications of other cellular subscribers. Alternatively, the particular part of the cellular network being accessed may not yet have been upgraded to support digital traffic channels. In such instances, for the subscriber desiring to immediately make a cellular data communication, a modem must be connected between the data terminal equipment and the mobile station in order to utilize an analog traffic channel to carry the communication. Such a modem is not always readily available, and thus this solution is neither economical nor practical.

There is a need then for a solution that would allow a subscriber to utilize their dual mode (analog and digital) cellular mobile station to engage in a cellular data communication over either an analog or digital air interface without subscriber need and use of a separate modem.

SUMMARY OF THE INVENTION

A mobile station in accordance with the present invention includes a data pump functionality for performing digital bit to waveform coding on a digital data signal communication received by the mobile station from a connected piece of data terminal equipment. The waveform coded analog data signal output from the data pump functionality is then transmitted over the analog air interface. In one embodiment, the transmission is made over an analog traffic channel of the analog air interface. In another embodiment, the data pump functionality multiplexes the waveform coded analog data signal with mobile station generated cellular system control signals for transmission over an analog control channel of the analog air interface. At the other end of the air interface transmission, another data pump functionality is provided in either the inter-working unit or the base station to recover digital data signals from the waveform coded analog data signals transmitted over the air interface. In connection with the second embodiment, the data pump functionality further demultiplexes the received analog control channel transmission to separate the wave form coded analog data signal from the cellular system control signal. For a data communication sent to the mobile station, the reverse operations are performed by the included data pump functionalities at either end of the analog air interface.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
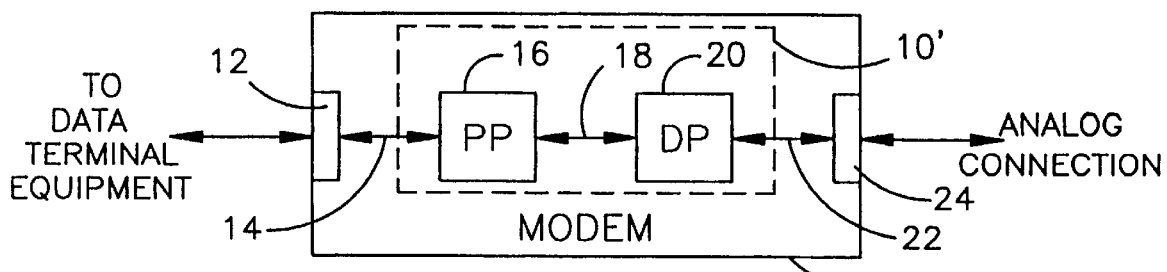
FIG. 1 is a simplified block diagram of a modulator/demodulator (modem)

Reference is now made to FIG. 1 wherein there is shown a simplified block diagram of a modulator/demodulator (modem) 10 having a configuration known to those skilled in the art. The modem 10 includes a serial data port 12 that may be connected to any one of a number of data devices (not shown) including, for example, a data terminal (personal computer or laptop). Connected to the data port 12 via connection 14 is a protocol processor (PP) 16 for performing a data formatting function implementing a particular V.X modem communications protocol, like V.34 or V.42bis. Connected to the protocol processor 16 via a connection 18 is a data pump (DP) 20 that performs the actual modulator and demodulator functions for the modem 10 by means of a digital bit to wave form coding and decoding operation. Connected to the data pump 20 via connection 22 is an analog port 24 for making an analog communications connection to, for example, an analog telephone line, link or connection (not shown). The connection 14, protocol processor 16, connection 18, data pump 20 and connection 22 form a modem portion 10' of the modem 10, with the modem portion used when a modem functionality is incorporated within a device rather than provided or implemented as a stand-alone product.

In a data transmission mode of operation, a serial digital data signal output from a data terminal is received at serial data port 12 and formatted in accordance with the appropriate communications protocol by the protocol processor 16. This formatting operation includes breaking the binary data stream of the digital data signal into sets of bits (or frames). The formatted digital data signal is then modulated by the data pump 20 onto the carrier as a unique combination of carrier phase and amplitude changes, and output as an analog data signal from the analog port 24. The reverse functional operations take place with respect to analog data signals received by the modem 10 at the analog port 24. Thus, the phase and amplitude changes in the received analog data signal are first demodulated by the data pump 20, and the signal is then converted (i.e, de-formatted) in accordance with the proper protocol by the protocol processor 16 to reconstruct the original binary data stream for output from data port 12.

Figure 2:
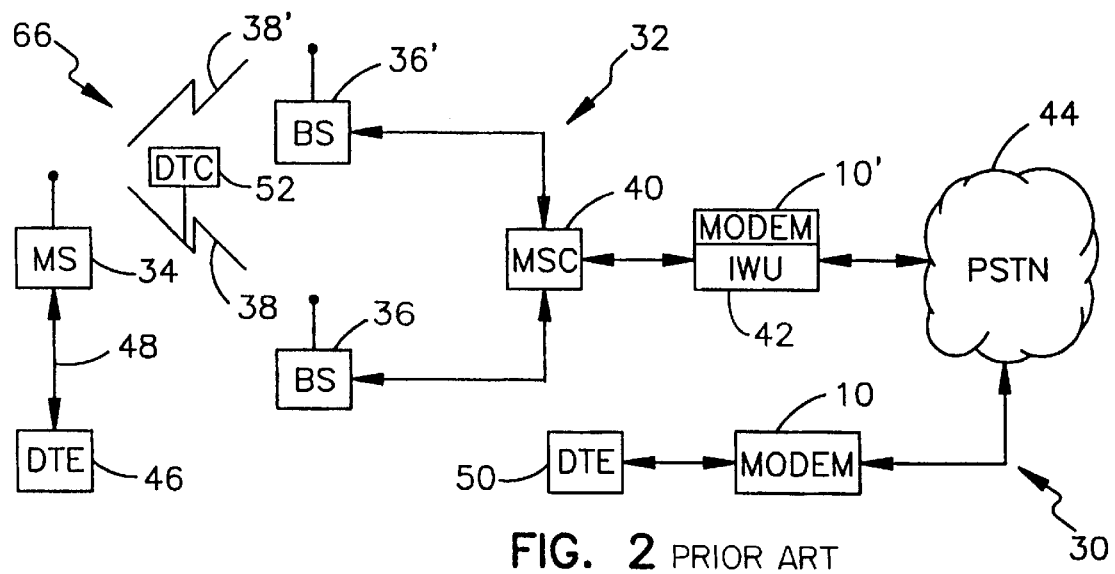
FIG. 2 is a block diagram of a telephone network including a cellular communications portion.

Reference is now made to FIG. 2 wherein there is shown a block diagram of a telephone network 30 including a cellular communications portion 32. The cellular communications portion 32 includes a mobile station (MS) 34 in radio frequency communication with a fixed site base station (BS) 36 by way of an air interface 38. The mobile station 34 comprises a dual mode mobile station, meaning that it is capable of communicating over the air interface 38 in either an analog or a digital mode. In that connection, it will be understood that the base station 36 further supports both analog and digital communications over the air interface 38 as well.

The cellular communications portion 32 of the telephone network 30 further includes a mobile switching center (MSC) 40 connected to a plurality of base stations including the illustrated base station 36. The mobile switching center 40 performs the switching functions for routing telephone calls to and from mobile stations 34. The mobile switching center is connected to an inter-working unit (IWU) 42 which includes a modem portion 10' which may be of the same type as that shown in FIG. 1. The inter-working unit 42 functions to interface the cellular communications portion 32 of the telephone network 30 to the public switched telephone network 44.

The telephone network 30, including its cellular communications portion 32, supports data transmissions as well as voice transmissions. For data communications, a cellular service subscriber (not shown) may connect data terminal equipment (DTE) 46 comprising, for example, a personal computer (laptop) via a serial digital data signal connection 48 to the mobile station 34. A data call transmitting, and perhaps exchanging, digital data signals may then be made to or received from a second data terminal equipment 50. In this example, second data terminal equipment 50 is shown connected through a modem 10 (like that shown in FIG. 1) to the public switched telephone network 44. A digital traffic channel (DTC) 52 is seized in connection with the data call to support the transmission of the digital data signal over the air interface 38. The modem portion 10' within the inter-working unit 42 performs the protocol conversions, formatting, de-formatting, modulations and demodulations necessary for analog transmission of the digital data signals for the data call to and from the public switched telephone network 44. The modem 10 connected to the second piece of data terminal equipment 50 performs the same functions with respect to also making a communications connection with the public switched telephone network 44.

Figure 3:
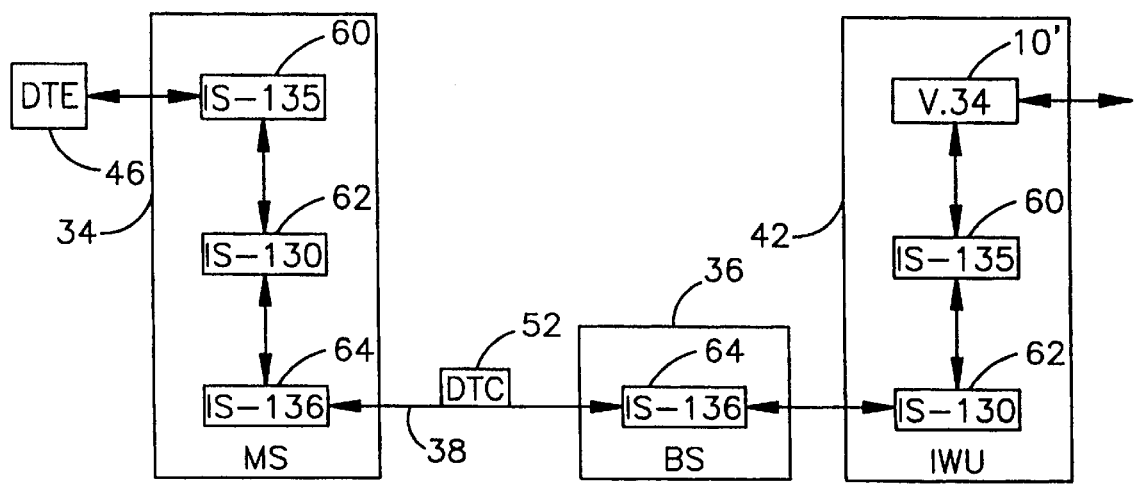
FIG. 3 is a schematic diagram of the cellular communications portion of the telephone network illustrating its operation in connection with making a data communication over a digital air interface.

Reference is now made to FIG. 3 wherein there is shown a schematic diagram of the cellular communications portion 32 of the telephone network 30 illustrating its operation in connection with handling a data communication. The mobile station 34 processor (not shown) operates in accordance with TIA/EIA IS-135 Specification functionality 60 and the IS-130 Specification functionality 62 to support digital data services with respect to a connected piece of digital terminal equipment 46. Specifically, these functionalities 60 and 62 allow the mobile station 34 to support the Hayes AT modem command set, provide V.X, and in particular, V.42bis, data/fax services and implement any necessary radio link protocols (RLP) for sending and receiving digital data signals of the type carried over, for example, connection 14 of the modem portion 10' (FIG. 1). The IS-130 Specification functionality 62 requires a TIA/EIA IS-136 Specification transport layer 64 to convey the digital data signals. This restricts the mobile station 34 to a data communication mode of operation through the use of one of the air interface 38 made available digital traffic channels 52.

The signal processing effectuated within the base station 36 functions to remove the digital data signal transmission from the TIA/EIA IS-136 Specification transport layer 64 digital traffic channel 52. Signal processing in accordance with TIA/EIA IS-130 Specification functionality 62 and TIA/EIA IS-135 Specification functionality 60 effectuated within the inter-working unit 42 further processes the received digital data signal in accordance with the appropriate radio link protocols to support the digital data services and recover the digital data signal originally sent by the data terminal equipment 46. The recovered digital data signal is then further processed by the modem portion 10', implementing, for example, the V.34 protocols, for analog data signal transmission of the data communication toward the public switched telephone network 44 (see, FIG. 2).

Reference is now made to both FIGS. 2 and 3. Mobile stations 34 have a tendency to roam throughout the cellular service area. Often times, such roaming occurs during a call (either voice or data) and it becomes necessary for the cellular communications portion 32 of the telephone network 30 to change the base station 36 through which cellular communications services are being effectuated. This practice, commonly referred to as hand-off or handover, is generally illustrated occurring at 66 (of FIG. 2) where the mobile station 34 is switching its air interface communication from base station 36 to base station 36'. In some instances, the air interface 38 supported by a currently serving one of the base stations 36 differs, as is shown, from the air interface 38' supported by the target base station 36' at hand-off. This necessitates not only a change in traffic channel for the mobile station 34, but also may necessitate a change in the hyperband being used and perhaps the mode (analog versus digital) of mobile station operation. This may also introduce problems (discussed below) in maintaining the cellular communication after hand-off occurs.

Suppose, for example, that the base station 36 supports use of a dual mode (analog and digital) air interface 36 while the base station 36' supports an air interface 38' that is either analog only or is dual mode but presently has only analog service capabilities available (perhaps due to loading problems on the digital side). Further suppose that the mobile station is currently engaged in a data communication using base station 36 and its air interface 38. Because the TIA/EIA IS-130 Specification functionality 62 requires a TIA/EIA IS-136 Specification transport layer 64 for digitally transmitting the data communication, and because the analog air interface 38' has not historically been able to provide that transport layer 64, data services cannot be provided to the mobile station 34 and the currently engaged data communication is lost when a hand-off 66 of the mobile station 34 is made from base station 36 to base station 36'.

Figure 4:
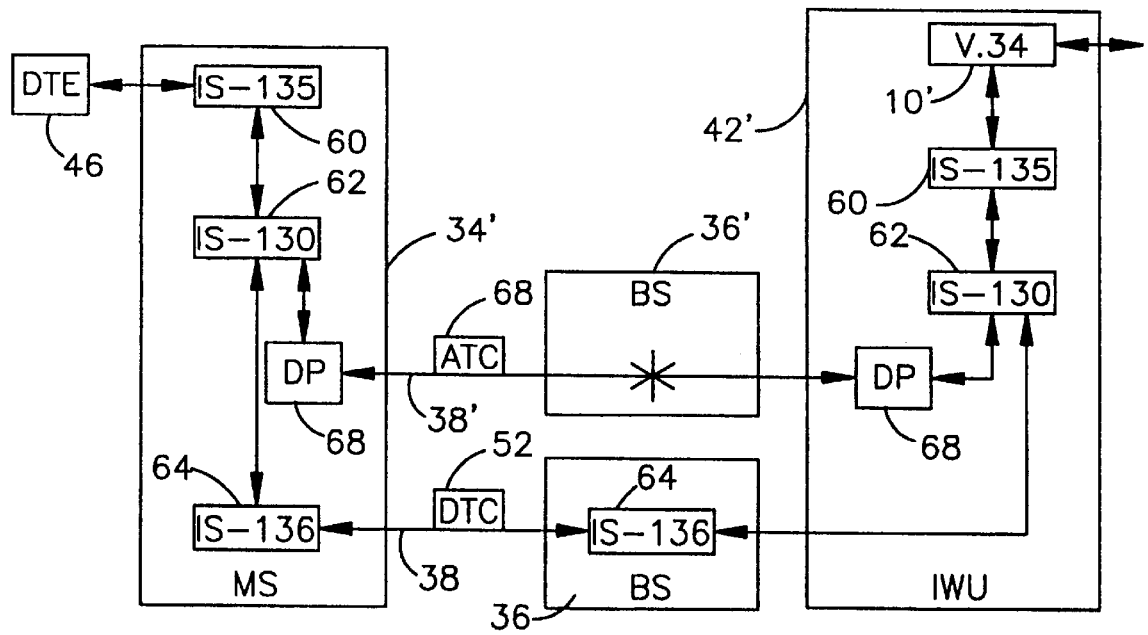
FIG. 4 is a schematic diagram of the cellular communications portion of the telephone network illustrating a dual mode data transmission system of the present invention and its operation in connection with making a data communication over an analog, as well as a digital, air interface.

Reference is now made to FIG. 4 wherein there is shown a schematic diagram of the cellular communications portion 32 of the telephone network 30 illustrating a dual mode data transmission system of the present invention and its operation in connection with making a data communication over an analog, as well as a digital, air interface. The mobile station 34' processor implements the TIA/EIA IS-135 Specification functionality 60 and the IS-130 Specification functionality 62 to support digital data services with respect to the connected digital terminal equipment 46. Specifically, these functionalities 60 and 62 allow the mobile station 34' to support the Hayes AT modem command set, provide V.X, and in particular, V.42bis, data/fax services and implement all necessary radio link protocols (RLP) for sending and receiving digital data signals. With respect to the making of a data communication using the digital air interface 38, the mobile station 34' operates in the same manner as the mobile station 34 shown in FIGS. 2 and 3 using an IS-136 transport layer 64. To make a data communication using the analog air interface 38', however, the mobile station 34' further includes a V.32 or similar data pump 68 for performing any digital to analog (or vice versa) data signal conversions needed to transmit (or receive) information over the analog air interface 38'. These conversions comprise the modulation and de-modulation of the data signals using a unique combination of carrier phase and amplitude changes. The data pump 68 further functions to emulate the TIA/EIA IS-136 Specification transport layer 64 expected by the IS-130 Specification functionality 62 and enable, through implementation of an appropriate modem link protocol (MLP), access to an analog traffic channel (ATC) 68 of the air interface 38'. The inter-working unit 42' at the other end of the analog data signal communication made through the base station 36' also includes a V.32 or similar data pump 68 to perform the same operations.

Figure 5:
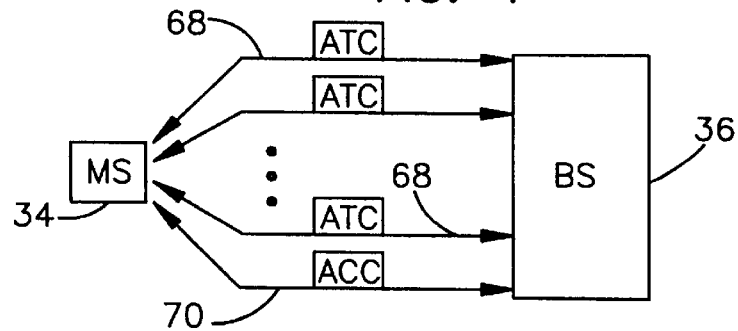
FIG. 5 is a schematic diagram of the analog air interface.

Reference is now made to FIG. 5 wherein there is shown a schematic diagram of the analog air interface 38' which shows that the air interface includes a plurality of analog traffic channels 68 and at least one analog control channel (ACC) 70. The analog control channel 70 is Manchester encoded to carry control messages and signals between the base station 36 and the mobile station 34. Even though it has a relatively high data rate, the control channel 70 is not a particularly efficient carrier of control messages and signals due to message repetition requirements. Thus, even with an available bandwidth of ten kilohertz, only approximately one-hundred fifty bits per second of control signaling are actually transmitted over the channel 70.

Figure 6:
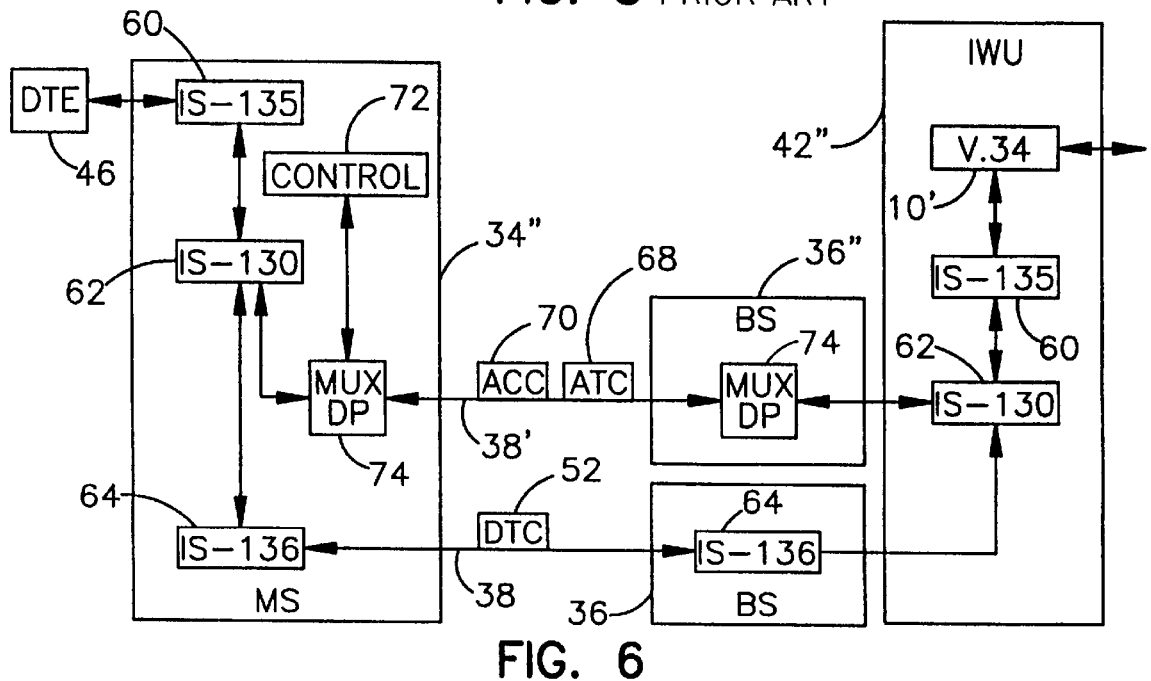
FIG. 6 is a schematic diagram of the cellular communications portion of the telephone network illustrating an alternative embodiment of a dual mode data transmission system of the present invention and its operation in connection with making a data communication over an analog, as well as a digital, air interface.

Reference is now made to FIG. 6 wherein there is shown a schematic diagram of the cellular communications portion 32 of the telephone network 30 illustrating an alternative embodiment of a dual mode data transmission system of the present invention and its operation in connection with making a data communication over an analog, as well as a digital, air interface. The mobile station 34" further includes a control functionality 72 for processing and responding to received control messages and signals, as well as generating outgoing control messages and signals. The mobile station 34" processor operates in accordance with TIA/EIA IS-135 Specification functionality 60 and the IS-130 Specification functionality 62 to support digital data services with respect to a connected piece of digital terminal equipment 46. Specifically, these functionalities 60 and 62 allow the mobile station 34" to support the Hayes AT modem command set, provide V.X, and in particular, V.42bis, data/fax services and implement any necessary radio link protocols (RLP) for sending and receiving digital data signals. With respect to the making of a data communication using the digital air interface 38, the mobile station 34" operates in the same manner as the mobile station 34 shown in FIGS. 2 and 3 using an IS-136 transport layer 64. The mobile station 34" further includes a V.32 data pump (MUX DP) 74 for performing any digital to analog (or vice versa) conversions needed to transmit (or receive) information over the analog air interface 38'. These conversions comprise the modulation and de-modulation of the data signals using a unique combination of carrier phase and amplitude changes. The data pump 74 further functions as an IS-136 emulator, in the manner described above, as well as a multiplexer and de-multiplexer with respect to the control messages and signals transmitted to and from the control functionality, and the data communications transmitted to and from the IS-130 Specification functionality 62. Multiplexed control messages and signals and analog data signals are then transmitted between the mobile station 34" and base station 36" using different logical sub-channels within the analog data control channel 70 of the analog air interface 38'. The base station 36" at the other end of the analog communication made using the analog control channel 70 also includes a V.32 data pump 74 to perform the same operations. Thus, multiplexing and de-multiplexing is performed with respect to the control messages and signals and the data signals transmitted to and from the inter-working unit 42". The data pump 74 of the base station 36" also performs any digital to analog (or vice versa) conversions needed to transmit (or receive) information over the analog air interface 38'. The inter-working unit 42" includes the TIA/EIA IS-130 Specification functionality 62 connected to both the data pump 74 of base station 36" as well as the TIA/EIA IS-136 Specification transport layer 64 of the base station 36. The inter-working unit 42" further includes the IS-135 Specification functionality 60 as well as a modem portion 10', implementing, for example, the V.34 protocol.\

The communications systems illustrated in FIGS. 4 and 6 accordingly support mobile station 34' and 34" operation over the digital traffic channels 52, the analog traffic channels 68 and the analog control channel 70. Thus, during mobile station 34' and 34" operation, support is provided for not only the initial communications selection of, but also the hand-off of data communications among and between any of the digital traffic channels 52, the analog traffic channels 68 and/or the analog control channel 70. Hand-off is effectuated in the manner well known in the art. The control functionality 72 controls mobile station 34" operation in making the initial and hand-off selections with respect to transmission over the analog or digital air interfaces.

Although preferred embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. In particular, although illustrated and disclosed in connection with an implementation under the IS-130/135 Specification, it will be understood that the present invention may be equally well implemented in connection with other modem specifications including, for example, a Global System for Mobile (GSM) Communications data modem.

What is claimed is:

1. A mobile station for effectuating data communications over an air interface of a cellular telephone network, comprising:

means for interfacing the mobile station to a piece of data terminal equipment communicating using digital data signals, said means for interfacing processing the digital data signals according to at least one digital communications protocol;

a data pump, connected to the means for interfacing, for performing digital bit to analog waveform coding of the digital data signals transmitted by the data terminal equipment and processed by the means for interfacing to output analog data signals, and also performing de-coding on received analog data signals to output digital data signals for processing by the means for interfacing and transmitting to the data terminal equipment; and means for connecting the data pump to an analog air interface of the cellular telephone network for transmission and reception of the analog data signals over the analog air interface.

2. The mobile station as in claim 1 wherein the analog air interface includes a plurality of analog traffic channels, and the means for connecting the data pump to the analog air interface connects the mobile station to a selected one of the analog traffic channels for transmission and reception of the analog data signals over the analog air interface.

3. The mobile station as in claim 2 wherein the analog air interface further includes an analog control channel, further including means for switching the data communications connection between the selected one of the analog traffic channels and the analog control channel.

4. The mobile station as in claim 1 wherein the analog air interface includes at least one analog control channel, and the means for connecting the data pump to the analog air interface connects the mobile station to the analog control channel for transmission and reception of the analog data signals over the analog air interface.

5. The mobile station as in claim 4 wherein the analog air interface further includes a plurality of analog traffic channels, further including means for switching the data communications connection between the analog control channel and a selected one of the plurality of analog traffic channels.

6. The mobile station as in claim 4 further including a control functionality for processing transmitted and received cellular telephone network control signals, and wherein the means for connecting the data pump to the analog air interface is connected also to the control functionality and further multiplexes and de-multiplexes the analog data signals and control signals transmitted and received together over the analog control channel of the analog air interface.

7. The mobile station as in claim 1 wherein the cellular telephone network further includes a digital air interface having a plurality of digital traffic channels, the mobile station further including means for connecting the digital data signals for transmission and reception over a selected one of the digital traffic channels of the digital air interface.

8. The mobile station as in claim 7 further including means for switching the data communications connection between the selected one of the digital traffic channels of the digital air interface and a selected analog channel of the analog air interface.

9. The mobile station as in claim 8 wherein the analog channel comprises an analog traffic channel.

10. The mobile station as in claim 8 wherein the analog channel comprises an analog control channel.

11. The mobile station as in claim 1 wherein the at least one digital communications protocol includes a digital radio link protocol.

12. The mobile station as in claim 11 wherein the data pump emulates a digital air interface protocol when receiving signals form and transmitting signals to the means for interfacing.

13. A cellular telephone network supporting data communications to and from a piece of data terminal equipment communicating using digital data signals, comprising:

a cellular telephone connected to the data terminal equipment and including a data pump for converting between the digital data signals and analog data signals;

a base station in radio frequency communication with the cellular telephone;

an analog air interface over which the analog data signals are radio frequency transmitted between the cellular telephone and the base station; and an inter-working unit connected to the base station for interfacing the cellular telephone network to a public switched telephone network, said inter-working unit processing signals received from and transmitted to the base station according to a digital communication protocol.

14. The cellular telephone network as in claim 13 wherein the analog air interface includes a plurality of analog traffic channels, and the cellular telephone and base station each include means for communicating the analog data signals over a selected one of the analog traffic channels of the analog air interface.

15. The cellular telephone network as in claim 14 wherein the analog air interface further includes an analog control channel, and the cellular telephone further includes means for switching the data communications connection between the selected one of the analog traffic channels and the analog control channel.

16. The cellular telephone network as in claim 14 further including a digital air interface, the cellular telephone including means for switching data signal communication between the selected analog traffic channel and a digital traffic channel of the digital air interface.

17. The cellular telephone network as in claim 14 wherein the inter-working unit includes a data pump for converting between the analog data signals transmitted over the analog air interface and the digital data signals.

18. The cellular telephone network as in claim 14 wherein the inter-working unit further includes a modem for data communications interfacing of the cellular telephone network to the public switched telephone network.

19. The cellular telephone network as in claim 13 wherein the analog air interface includes at least one analog control channel, and the cellular telephone and base station each include means for communicating the analog data signals over the analog control channel of the analog air interface.

20. The cellular telephone network as in claim 19 wherein the mobile station further includes a control functionality for processing transmitted and received cellular telephone network control signals, and wherein the data pump of the mobile station is also connected to the control functionality and further multiplexes and de-multiplexes the analog data signals and control signals transmitted and received together over the analog control channel of the analog air interface.

21. The cellular telephone network as in claim 20 wherein the base station includes a data pump for multiplexing and de-multiplexing the analog data signals and control signals transmitted and received over the analog control channel of the analog air interface and also converting between the analog data signals transmitted over the analog air interface and the digital data signals, said base station data pump emulating a digital air interface protocol.

22. The cellular telephone network as in claim 13 wherein the digital communications protocol comprises a digital radio link protocol.

23. A method for effectuating communication of data terminal equipment digital data signals over a cellular telephone network using a mobile station capable of radio frequency communication over an analog air interface, comprising the step of:

receiving in the mobile station the digital data signal from the data terminal equipment;

processing the digital data signals transmitted by the data terminal equipment according to a digital communications protocol;

performing in the mobile station digital bit to analog waveform coding of the processed signals to output analog data signals; and transmitting by the mobile station of the analog data signals over the analog air interface of the cellular telephone network.

24. The method as in claim 23 wherein the analog air interface includes a plurality of analog traffic channels, and the step of transmitting comprises the step of communicating the analog data signals over a selected one of the analog traffic channels of the analog air interface.

25. The method as in claim 23 wherein the analog air interface includes an analog control channel, and the step of transmitting comprises the step of switching data signal communication between the selected analog traffic channel and the analog control channel.

26. The method as in claim 23 wherein the analog air interface includes at least one analog control channel, and the step of transmitting comprises the step of communicating the analog data signals over the analog control channel of the analog air interface.

27. The method as in claim 26 wherein the analog air interface includes a plurality of analog traffic channels, and the step of transmitting comprises the step of switching data signal communication between a selected analog traffic channel and the analog control channel.

28. The method as in claim 26 wherein the mobile station further transmits cellular telephone network control signals over the analog control channel, and the step of performing further includes the step of multiplexing the control signals and the analog data signals together for communication over the analog control channel of the analog air interface.

* * * * *